United States Patent [19]
Kotliar et al.

[11] Patent Number: 4,886,689
[45] Date of Patent: Dec. 12, 1989

[54] MATRIX-MATRIX POLYBLEND ADHESIVES AND METHOD OF BONDING INCOMPATIBLE POLYMERS

[75] Inventors: Abraham M. Kotliar, Westfield; William Sacks, Gillette; John P. Sibilia, Livingston; Rakesh Kumar, Parsippany, all of N.J.

[73] Assignee: Ausimont, U.S.A., Inc., Morristown, N.J.

[21] Appl. No.: 196,819

[22] Filed: May 19, 1988

Related U.S. Application Data

[63] Continuation of Ser. No. 901,661, Aug. 29, 1986, abandoned.

[51] Int. Cl.[4] .......................... B27N 5/02; B29C 47/06
[52] U.S. Cl. .............................. 428/35.7; 156/244.27; 156/327; 156/333; 428/422; 525/194; 525/197; 525/199; 525/200; 525/903; 525/931
[58] Field of Search ............... 428/35.7, 422; 156/327, 156/333, 244.27; 525/194, 200, 197, 903, 199, 931

[56] References Cited

U.S. PATENT DOCUMENTS

| | | | |
|---|---|---|---|
| 3,026,229 | 3/1962 | Wilcox | 156/306.6 |
| 3,836,620 | 9/1974 | Bhuta et al. | 156/244.11 |
| 3,928,494 | 12/1975 | Aliberti . | |
| 3,931,356 | 1/1976 | Dalton . | |
| 3,987,126 | 10/1976 | Brodoway | 525/200 |
| 4,042,441 | 8/1977 | Wasserman et al. | 156/329 |
| 4,115,492 | 9/1978 | Mahoney . | |
| 4,497,856 | 2/1985 | Iwasawa et al. | 428/422 |
| 4,609,468 | 9/1986 | Cramm . | |
| 4,677,017 | 6/1987 | De Antonis et al. | 428/422 |
| 4,705,809 | 11/1987 | Dighton . | |

FOREIGN PATENT DOCUMENTS

| | | | |
|---|---|---|---|
| 0015556 | 9/1980 | European Pat. Off. | 525/931 |
| 61-8350 | 1/1986 | Japan | 428/422 |

OTHER PUBLICATIONS

D. R. Paul and Seymour Newman, Polymer Blends, Academic Press, New York (1978), pp. 148–152.
Chemical Abstracts No. 106:215084y (Japanese Patent No. 62-41,314, issued Feb. 23, 1987).
Chemical Abstracts No. 106:121047, (Japanese Patent No. 61-200,806, issued Sep. 5, 1986).
Chemical Abstracts No. 106:121053 (Japanese Patent No. 61-238,834, issued Oct. 24, 1986).
Chemical Abstracts No. 106:112796c (European Patent No. 191,209, issued Aug. 20, 1986).
Chemical Abstracts No. 103:143115x (Japanese Patent No. 60-102,907, issued Jun. 7, 1985).
Chemical Abstracts No. 103:143116y and 143117z (Japanese Patents 60-99,325 and 60-99,324 both issued Jun. 3, 1985).
Chemical Abstracts No. 103:216582j (Japanese Patent No. 60-137,942, issused Jul. 22, 1985).
Chemical Abstracts No. 103:216583k (Japanese Patent No. 60-137,964, issued Jul. 22, 1985).
Chemical Abstracts No. 103:216558r (Japanese Patent No. 60-144,342, issued Jul. 30, 1985).
Chemical Abstracts No. 108:113824p (Japanese Patent No. 62-192,431, issued Aug. 24, 1987).
Chemical Abstracts No. 108:113833r (Japanese Patent No. 62-183,837, issued Aug. 12, 1987).
Journal of Applied Polymer Science, vol. 21, pp. 1883–1900 (1977).
Jounral of Applied Polymer Science, vol. 25, pp. 1969–1989 (1980).
Journal of Colloid and Interface Science, (vol. 46, No. 1, Jan. 1974, pp. 46–75.

*Primary Examiner*—John J. Gallagher
*Attorney, Agent, or Firm*—John G. Gilfillan, III; Elliot M. Olstein; Raymond J. Lillie

[57] ABSTRACT

A novel adhesive is described, consisting of a matrix-matrix polyblend of polymer components useful in an adhesive tie layer to bond incompatible polymer layers. The adhesives are a blend of the components making up the incompatible polymer layers themselves, or polymers substantially similar to these, and are melt processed to produce a matrix-matrix morphology with mechanical interlocking of the polymer components that is maintained upon cooling. Additives may be provided in one or both adhesive components to improve the cohesive strength of the adhesive formed by the mechanical interlocking.

30 Claims, No Drawings

MATRIX-MATRIX POLYBLEND ADHESIVES AND METHOD OF BONDING INCOMPATIBLE POLYMERS

This is a continuation of application Ser. No. 901,661, filed Aug. 29, 1986, now abandoned.

FIELD OF THE INVENTION

This invention relates to the adhesive bonding of incompatible or partially compatible polymers with adhesives composed of polymer volume fractions that are interfacially interlocked.

BACKGROUND OF THE INVENTION

Processes which allow dissimilar polymers to be combined in multilayered products have been developed commercially to manufacture films, sheet, pipe and tubing, and containers. In these processes, polyolefin resins such as polyethylene or polypropylene are commonly used and co-laminated with polyamides, ethylene-vinyl alcohol, vinylidene chloride resins, or other polymers, often by using a coextrusion process. The polyolefin layers in these products normally comprise the major fraction of the total thickness to provide strength and toughness at relatively low cost. The other resins used in thinner layers generally provide special barrier properties such as resistance to the passage of oxygen and other gases.

Since most polymers which are dissimilar to polyolefins do not adhere to polyolefins when colaminated, it has been necessary to develop special coextrudable adhesive resins to bond the polyolefin layer to the dissimilar polymer layer. Thus, various modifications have been made in the past to ethylene polymers and copolymers to provide adhesive resins suitable for use with polyamides or vinylidene chloride resins.

In general, polymers are dissimilar and are incompatible or have limited compatibility when they have different compositional contents, since long chain molecules greatly reduce the entropy of mixing and the heat of mixing is most often small and positive. Under these conditions, there is little or no diffusion of molecules across the interface nor strong adsorption of molecules from one polymer phase onto the other. The presence of these factors plays a crucial role during the formation of an adhesive bond and the subsequent strength of the adhesive bond when subjected to triaxial stresses imposed or caused by the differential expansion or contraction of the two bonded materials.

One class of polymers desirable for combining with polyolefins via multiple-layer co-lamination are the melt processable fluoropolymers, examples of which are ethylene-chlorotrifluoroethylene copolymers (E-CTFE) available under the trademark Halar®, vinylidene fluoride polymers, chlorotrifluoroethylene copolymerized with vinylidene fluoride available under the trademark Aclon®, tetrafluoroethylene, hexafluoropropylene, and copolymers thereof, and so on. These polymers are characterized by high chemical inertness to attack by strong chemicals such as concentrated mineral acids, oxidizing chemicals, and other highly reactive substances. In combination with polyolefins, these fluoropolymer layers would provide new types of containers, sheet products, and tubular shapes for use in contact with strong chemicals. For example, bottles may be made from high density polyethylene resins (HDPE) having a thin layer of E-CTFE on the inside surface to contain strong acids, or polypropylene pipe with a thin E-CTFE layer to convey these acids.

In light of the above desirable applications there has long been a need for a satisfactory, preferably coextrudable, adhesive resin for bonding polymers with little or no compatibility.

SUMMARY OF THE INVENTION

The present invention provides a method of forming a laminated composite with "incompatible polymers" which comprises the steps of:

(a) arranging layers of each of said polymers in apposition to one another with an adhesive composed of two or more polymers interposed between said layers, said polymers in the adhesive being present as "interfacially interlocked" polymer volume fractions; and (b) applying heat and pressure to form a laminated composite comprised of polymer layers with an adhesive interposed between the layers and bonded thereto.

The present invention also provides an adhesive for bonding incompatible or partially compatible polymers, which comprises a matrix-matrix polyblend, and a composite formed with polymer layers having said matrix-matrix polyblend adhesive interposed therebetween.

DETAILED DESCRIPTION OF THE PRESENT INVENTION

In the method of the present invention, a lasting adhesive bond may be formed between incompatible polymers, or polymers with partial compatibility, by using an adhesive composed of interfacially interlocked polymer volume fractions.

As used herein, the term "interfacial" means adjoining surfaces between polymer components in the adhesive or between the adhesive layer and polymer layers of a laminated composite.

The term "incompatible polymers" means polymers with different compositional contents wherein there is little or no diffusion of molecules across an interface of the polymers, nor strong absorption of molecules from one polymer phase into the other.

"Partially compatible polymers" are those with different compositional contents that would allow some diffusion of molecules across an interface of two or more of the polymers, and some absorption of molecules from one polymer phase into the other, but not enough to allow satisfactory bonding of layers of the polymers to one another.

Illustrative of polymers which may be at least partially incompatible with each other are those selected from the group of thermoplastic polymers such as polyesters, polyamides, polyolefins, halopolymers, and the like.

"Interfacial interlocking" is synonymous with mechanical interlocking and means forming a high degree of mechanically interlocked bonds, i.e.: those where molten polymer volume fractions actually entwine and wrap around one another in the melt, and are solidified in this state.

In the first step of the method of the present invention, incompatible or partially compatible polymers are brought together as layers in apposition to one another, with the adhesive of the invention interposed between the layers.

Polymer combinations useful as these layers may vary widely, and essentially any combination of incompatible or partially compatible polymers can be used, providing there is an overlapping temperature range in the processing of the components. Illustrative of polymers that may be combined in layers are polyethylene, polypropylene, poly (1-butene), poly (3-methyl-1-butene), poly (1-pentene) poly (4-methyl-1-pentene), poly (1-hexene), poly (5-methyl-1-hexene), poly (1-octadecene), polyisobutylene, 1,2-poly (1.3-butadiene) (iso), 1,2-poly (1,3-butadiene) (syndio), polystyrene, poly (°-methylstyrene), poly (2-methylstyrene), poly (4-methylstyrene), poly (4-methoxystyrene), poly (4-phenylstyrene), poly (3-phenyl-1-propene), poly (2-chlorostyrene), poly (4-chlorostyrene), poly (vinyl fluoride), poly (vinyl chloride), poly (vinyl bromide), poly (vinylidene fluoride), poly (vinylidene chloride), poly (tetrafluoroethylene), poly (chlorotrifluoroethylene), poly (vinylcyclopentane), poly (vinylcyclohexane), poly (a-vinylnaphthalene), poly (vinyl methyl ether), poly (vinyl ethyl ether), poly (vinyl propyl ether), poly (vinyl isopropyl ether), poly (vinyl butyl ether), poly (vinyl isobutyl ether) poly (vinyl sec-butyl ether), poly (vinyl tert-butyl ether), poly (vinyl hexyl ether), poly (vinyl octyl ether), poly (vinyl methyl ketone), poly (methylisopropenyl ketone), poly (vinyl formate), poly (vinyl acetate), poly (vinyl propionates), poly (vinyl chloroacetate), poly (vinyl trifluoroacetate), poly (vinyl benzoate), poly (vinylcarbazole), poly (methylacrylate), poly (ethylacrylate), poly (propyl acrylate), poly (isopropyl acrylate), poly (butyl acrylate), poly (isobutylacrylate), poly (sec-butyl acrylate), poly (tert-butyl acrylate), poly (methyl methacrylate), poly (ethyl methacrylate), poly (propyl methacrylate), poly (isopropyl methacrylate), poly (butyl methacrylate), poly (isobutyl methacrylate), poly (sec. butyl methacrylate), poly (tert butyl methacrylate), poly 2-ethylbutyl methacrylate), poly (hexyl methacrylate) poly (octyl methacrylate), poly (dodecyl methacrylate), poly (octadecyl methacrylate), poly (phenyl methacrylate), poly (benzyl methacrylate), poly (cyclohexyl methacrylate), poly (methyl chloroacrylate), copolymers of polyethylene containing carbonyl oxygen groups, such as esters, acids, and neutralized acids, such as those neutralized with sodium or zinc, especially copolymers of polyethylenes with carboxyl groups such as polyethylene-ethyl acrylate, polyethylene-methyl acrylate, polyethylene acrylic acid, polyethylene methacrylic acid and polyethylene-vinyl acetate, poly (1,3-butadiene)(cis), poly (1,3-pentadiene) (trans), poly (2-methyl 1,3-butadiene)(cis), poly (2 methyl 1,3 butadiene)(trans), poly (2 methyl 1,3-butadiene)(mixt), poly (2-tert-butyl 1,3-butadiene (cis), poly (2-chloro-1,3 butadiene).

It is preferred to select polymers that would exhibit varying chemical properties for each of the respective layers. For example, it is preferred to combine polyesters with polyolefins, polyphenylene oxide with polyamides, polysulfones with polyamides, polysulfones with polyesters, and halogen containing polymers with polyamides or conventional polyolefins and the like. It is particularly preferred to combine halopolymers with conventional polyolefins, as many halopolymers are characterized by a chemical inertness to attack by strong chemicals and the like, and demonstrate excellent barrier properties to water vapor, while conventional polyolefins are advantageous in that they may be easily fabricated into many shapes. The result is a composite which exhibits all or a portion of the properties of the halopolymer and the polyolefin.

Illustrative of the preferred polyolefins in halopolymer-polyolefin combinations are polyethylene and copolymers thereof such as high, linear low or low density polyethylene, copolymers of ethylene with propylene, vinyl esters such as acrylates, benzoates, proponates, formates, butyrates, and acetates, polypropylenes such as atactic, isotatic and impact modified polypropylenes, polybutylene, polyisobutylene, polystyrene, poly (1-butene), poly (3-methyl-1-butene), and ethers such as vinyl ethyl methyl ether, vinyl butyl ether, vinyl isopropyl ether and the like. Copolymers of those listed above are also useful.

Halopolymers useful in these combinations are the fluoropolymers such as chlorotrifluoropolymers, vinylidene fluoride, tetrafluoroethylene, and the copolymers of tetrafluoroethylene and hexafluoropropylene, ethylene-tetrafluoroethylene, perfluoroalkoxy resins, polyvinyl fluoride and vinylidene fluoride and chloropolymers such as polyvinylchloride, chlorinated polyethylene and polyvinylchloride and vinylidene chloride.

Particular fluoropolymers which are useful include: HALAR®, which is an ethylene chlorotrifluoroethylene copolymer sold by Allied Corporation and described in *Halar® Fluoropolymer Resin, Technical Data Bulletin, Chemical Resistant Halar® Fluoropolymer*, hereby incorporated by reference; Kureha KF ™ Polymer, which is a polyvinylidene fluoride sold by National Tank and Pipe Co. and described in *KF Polymer PVF$_2$ Polyvinylidene Fluoride Chemical Resistance Guide*, hereby incorporated by reference; Teflon ™, sold by Dupont Company, FEP, which is a copolymer of hexafluoropropylene and tetrafluoroethylene sold by LNP Corporation and described in *LNP Bulletin P.D. 228-1275, Fortified Polymers*, hereby incorporated by reference; Tefzel ™, which is an ethylene tetrafluoroethylene copolymer sold by the DuPont Company and described in *DuPont Company Tefzel ETFE Fluoropolymer Bulletin* APD #2 (Feb. 1, 1971), hereby incorporated by reference, Aclon®, which is a chlorotrifluoropolymer containing vinylidene fluoride sold by Allied Corporation, and Aclar® which is the film version, also sold by Allied Corporation. Various copolymers of the above preferred fluoropolymers may be used, especially copolymers of tetrafluoroethylene and hexafluoropropylene, copolymers of ethylenechlorotrifluoroethylene, and the like.

Preferred combinations of polyolefins and halopolymers are ethylene-chlorotrifluoroethylene (ECTFE) or chlorotrifluoroethylene copolymers with vinylidene fluoride (CTFE-VF$_2$) with polyethylenes, polypropylenes, polyethylene-co-methacrylic acid, polyethylene-co-ethylacrylate, polyethylene vinyl acetate, and the like.

Especially preferred are copolymers of chlorotrifluoroethylene such as those trademarked under Halar® or Aclon® with polyethylene, atatic polypropylene, copolymers of polyethylene and polypropylene, and polyethylene-co-acrylic or methacrylic acid.

Although the present invention is particularly useful for bonding polymer layers that are incompatible with each other or have limited compatibility, it will be appreciated by those skilled in the art that there are many possible combinations that can be formulated. Thus, this selection does not necessarily have to be strictly limited to an incompatible polymer pair, as the polyblend concept (i.e.: significant surface fractions of each blend component at the adhesive surface) yields an effective tie layer between laminates of polymers having a range of compatibilities, even to the extent of being compatible with each other. Particularly useful examples of combinations of polymers that may be considered to have more than limited compatibility with each other, are polyvinyl chloride with poly-E-caprolactone, nylon 6 with phenoxy, polystyrene with polyphenylene oxide and the like.

The adhesive of the present invention is a melt blend of the polymers contained in the polymer layers themselves, and may be selected from any of those suggested above, governed only by the composition of the polymeric layers it is desired to laminate. Alternatively, the adhesive may contain polymers that are not identical to those in the polymer layers it is desired to laminate, but are sufficiently similar in nature to a corresponding component in the polymer layers to afford good bonding.

Illustrative of a blend system of polymers B and C wherein component B adheres to polymer layer A and component C adheres to polymer layer D would include laminating the chlorotrifluoro copolymer sold under the tradename Aclon ® to isotactic polypropylene using a blend of atatic polypropylene and Aclon ® copolymer in the adhesive; a nylon-polyethylene laminate using an adhesive tie layer composed of a blend of phenoxy resin with a copolymer of polyethylene ethylacrylate; a laminate of polysulfone to polyamide using a blend of polycarbonate of bisphenol A and a polyhydroxyether of bisphenol A as the adhesive tie layer; and so on.

The polyblend adhesive layer, or each of the respective polymer layers themselves may also contain particulate or fibrous fillers such as chopped glass, talc, mica, glass spheres and the like. These fillers can be of the reinforcing type or can be extenders. Any of the components can contain these fillers, the amount of filler being limited only in that it should not interfere with the availability of surface area of that component for bonding, to such an extent that it would substantially reduce the adhesive strength of the resulting bonded laminate.

The melt blend making up the adhesive of the invention is referred to as a "polyblend." In such a melt blend, or polyblend, the incompatible or partially compatible molten polymer volume elements of each of the components entwine with one another, and this state is maintained upon cooling and solidification of the molten polymers. The result is a solid blend wherein the components are mechanically interlocked. The components are not mixed to form a homogeneous composition, but rather, extended volume elements of the components are entwined with each other, locking the incompatible or partially compatible polymers into a cohesive element. In this manner, each of the blend components are present on the surface of an adhesive layer and will then strongly adhere to their respective compatible polymer layers when these layers are brought into alignment with the adhesive layer.

The relative content of each of the components in the adhesive of the present invention may vary widely. Each of the components in the adhesive blend should occupy a significant fraction of the adhesive surface of the adhesive layer to facilitate bonding to each respective polymer layer. In general, each respective adhesive component should occupy at least about 30% of the surface area of the adhesive layer, preferably about 30% to about 70%. However, to obtain a preferred amount of mechanical interlocking and optimal adhesion of polymer layers, it is particularly preferred that each of the components in the adhesive blend occupy about 45%–55% of the adhesive surface layer.

In general, the preferred properties of the adhesive increase as the morphology of the blend becomes increasingly of the matrix-matrix type. As used herein, a pure "matrix-matrix" type blend of adhesive components is referred to as a "matrix-matrix polyblend" and is achieved when each of the molten blend components is irregularly shaped and entwined with one another, (each component thus forming a continuous phase) consisting of a plurality of entwining polymer domains. The polymer domains are preferably a microscopic system of about 0.5 to about 50.0 microns in diameter.

The shape and size of these entwining polymer domains may vary widely. For example, each of these domains may be elongated, extending in and around each other. These entwined polymer domains may also have irregular polygonal shapes which are interlocked by mating with a matching displacement in the continuous phase of the other blend component, analogous to a lock and key or three-dimensional jigsaw puzzle configuration. The greater the degree to which the components are blended and entwined, the greater the degree of mechanical interlocking of the adhesive components upon cooling.

While a pure matrix-matrix morphology is most preferred, also preferred are those adhesives that are principally of the matrix-matrix type, but may contain local areas of the "island matrix" morphology. The latter morphology is apparent wherein droplets of one component are dispersed in a continuous matrix of the other component. It is preferred in these cases that the island matrix morphology be present in amounts less than about 20%, more preferably less than about 5%.

Matrix-matrix morphology, wherein the surface of the polyblend is composed of both phases, is a function of volume fractions, surface free energies, and melt viscosity ratios of the respective phases.

In preparing the polyblend adhesive to achieve a matrix-matrix morphology, a melt blending process is utilized by melting a powder blend or preformed pellet blend of the components.

The melt blending process to form the adhesive may be done prior to the process utilized to form the laminated composite, resulting in a pellet blend of the components that may be stored for later use in a lamination process. Alternatively, melt blending of the adhesive components may be carried out concurrently with a melt lamination process.

The relative amounts of components depend on the relative melt viscosities of the components. In general, the component having the greater melt viscosity is present in the greater amount; and conversely, the component having the lower melt viscosity is present in the lesser amount. This concept is more fully explained in G.H. Avgeropoulos et al., *Rubber Chem. Technol.*, 49, 93(1976), H. Van Dene, *J. Colloid Interface Sci.*, 40, 448 (1972), R.W. Flumerfeld, *Ind. Eng. Chem. Fundam.*, 11,312 (1972), and G.I. Taylor, *Proc. Ray. Soc. London*, A138, 41 (1932); A146,501 (1934). If one of the components has a much higher melt viscosity than the other, it will deform less and will therefore be present in relatively large droplets of poorly dispersed material. The lower melt viscosity component will, however, undergo larger deformation due to shear stress, and thereby form many small droplets. These small droplets have a greater tendency to coalesce, forming a continuum about the droplets of the more viscous component. It will thus be appreciated by one skilled in the art that a larger volume fraction of the more viscous component is required in this case to maintain a matrix-matrix morphology.

In practical terms then, a matrix-matrix type of structure can be achieved by melt blending a mixture of preferably equal volume fractions of each component when the melt viscosities are equal. However, at a melt viscosity ratio of greater than about 6, about a 70/30 to about 80/20 volume fraction of the higher melt viscosity component to the lower melt viscosity component will usually be required to achieve the required structure for sufficient fractional surface coverage for each component. At a melt viscosity ratio of about 1, it is expected that a 50/50 volume fraction should be optimum, assuming that the surface free energies for each of the components are equal. With organic polymers, one skilled in the art will appreciate that surface free energies are generally low and not very different, based on the Zisman wetting scale, and therefore not expected to be a primary factor.

Thus, for most purposes, it is generally preferred to utilize components that have a melt viscosity ratio of one to the other of between about 1-6, more preferably between about 1-3, and most preferably about 1. One finds that with component melt viscosity ratios greater than about 6, extremely high intensive shear mixing is required to break down the droplet size of the higher melt viscosity component to achieve the desired matrix-matrix morphology, and at these higher melt viscosity ratios, "island-matrix" morphology is more prone to exist.

The required volume fractions will also be affected by the elasticity, a factor that affects the extent of deformation and break up of the droplets of polymer adhesive components. The more elastic a component droplet, the less deformation needed to achieve droplet breakup. This elasticity may preferably be controlled by providing an interfacial modifier or (compatibilizer.)

It is preferred that the droplet interfacial modifier be an additive on one or more of the components in the polyblend adhesive itself, the additive not only affecting the elasticity of the droplet interfaces, but also inducing "interfacial bridging" between the polymer adhesive components. "Interfacial bridging" refers to the improvement of adhesion of adjoining surfaces of the polymer adhesive components within the polyblend, by the addition of an agent to one or both components that has affinity to the other component. Enhancement of the mechanical interlocking of the adhesive components is achieved in this manner, thus resulting in enhancement of overall bonding of incompatible polymer layers when the adhesive is used as a tie layer in a laminate.

The manner in which this bonding between the adhesive components is accomplished by the additives may vary widely. For example, such additives may be compounds added to one or both adhesive components that have a reactive group on one end that can chemically or ionically bond to one polymer component, these additives also having contain moieties or groups soluble in the other polymer component. The additives may also contain reactive groups on both ends of the additive that chemically or ionically bond to each respective polymer component; (or they may simply be groups added to one or both of the adhesive components that are compatible with each respective component of the adhesive.)

The additives comprise low molecular weight materials. Preferred of these materials are hydrocarbons such as, for example, aromatics, or alkyl chains having from about 1 to about 25 carbon atoms, preferably from about 6 to about 18 carbon atoms. Preferable among the latter are heptyl, nonyl, dodecyl, or stearyl groups, especially stearyl. The hydrocarbon itself may act as the additive in some cases, such as certain aromatics or alkyl groups capable of reacting with or dissolving into one or both components of the adhesive. Alternatively, the hydrocarbon may serve as a backbone for one or more functionalities or groups reactive or compatible with one or both of the adhesive components. In the latter case, these functionalities or groups chemically or ionically bond to or dissolve in one or both components.

Of the reactive end groups that may be present on one or both ends of an alkyl chain may be mentioned amino functionalities and their derivatives, thiols, peroxides, aromatics, phenols, ureas, amides, and the like, and combinations of these.

Besides amines and their derivatives, a variety of amine-generating compounds such as isocyanates, urethanes, carbamoyl halides and sulfonamides which have been used as curing agents for fluoroelastomers may function in a similar manner. These materials can be used in the monofunctional form to graft aliphatic compatible groups onto a polymer chain.

Preferred aliphatic chains containing a functional group are stearyl amine, stearyl thiol, nonylphenol, substituted benzene having aliphatic groups of at least about 18 carbon atoms, and so on. These may be conveniently obtained commercially.

The additives may be added to one or more of the adhesive components by any convenient method. For example, they may be coated onto one or more of the adhesive components while in a powdered form, or they may be metered into the adhesive melt stream during a lamination process. The additives are thereby dissolved into or grafted onto one or more of the adhesive components during extrusion.

When preparing a polyblend adhesive for lamination of fluoropolymer-polyolefin layers, it is preferred to add the bridging agent to the fluoropolymer first if the bridging agent contains aliphatic agents, since these aliphatic agents may be soluble in the polyolefin and would not necessarily migrate to the interface to be able to achieve the desired bridging effect.

In a preferred embodiment, bonding E-CTFE to polyethylene, an aliphatic group containing about 8 to about 18 carbon atoms is grafted to the E-CTFE by any conventional technique such as melt-blending in an extruder, before preparation of the polyblend adhesive. These long chain aliphatic groups are compatible with the polyethylene and have end groups reactive towards the halogen carbon bond of the fluoropolymer. Preferred of the reactive groups are amines, thiols, or phenols.

In this fluoropolymer-polyolefin system, other components might be useful to aid the grafting of the additives onto the fluoropolymer component. Of these may be mentioned those that act like an acid acceptor during this grafting of the additive. Illustrative of these are basic metal oxides, preferred of which are oxides of Group IIA and IIIA; most preferred of which are magnesium oxide and calcium oxide. Combinations of agents as additives are particularly useful for improved color and thermal control in the E-CTFE/polyolefin system. A preferred combination bridging agent system is amine/phenol/basic metal oxide.

Additives blended into the adhesive fluoropolymer component that are expected to react with the fluoropolymer will generally not affect the melt viscosity. However, if compounds such as the basic metal oxides are added into the system, melt viscosity will be somewhat higher, and this increase should be taken into consideration when determining the requisite volume fractions. For example, in the case of the basic metal oxide, about a 10-20% increase should be expected at about a 3% adding level.

The level of additive required for good bonding is that required to strengthen the matrix-matrix interfaces without extensive modification of the outer surface of the adhesive that is to bond to the polymer layers, particularly in the case of the fluoropolymer facing surface. Too high an amount in this case will mask a strong fluoropolymer-fluoropolymer bond between the adhesive layer and polymer layer containing fluoropolymer, and weaken a polyolefin-polyolefin bond between the adhesive layer and polymer layer containing polyolefin with a weaker aliphatic-polyolefin bond. Thus, the amount of additive utilized should not be such that it affects surface adhesion to the polymer layer it is desired to laminate. Suitable amounts of additive may be determined by one skilled in the art by measurement of work of peeling. Amounts of about 0.5% to 5% have been found to be useful, with about 1% to about 3% particularly preferred.

If a metal oxide is utilized, the best ratio of additive to metal oxide should also be established. This is expected to be sensitive to the particular size of the oxide since its basic function is to scavange the hydrogen halide. This reaction also produces water and the hydroxide of the metal oxide.

Elastomeric characteristics of the adhesive used in the present invention may affect the resultant adhesion of polymer layers. The differential shrinkage of the polymer phases causes high interfacial stresses which would be reduced by a rubbery component. Hence, it is preferred that the adhesive of the invention also contain components that can impart these rubbery characteristics. Various techniques may be utilized to impart these elastomeric characteristics. For example, polyolefins, containing carbonyl functionalities such as polypropylene acrylic acid, ethylacrylate, vinylformate, and the like, and polymers such as ethylene propylene rubber, and the like, may be blended into the adhesive during the melt blend process, or in some cases may be copolymerized with one or more of the polyblend adhesive components themselves. Thus, in a fluoropolymer-polyolefin adhesive polyblend, especially when the polyolefin is polyethylene or polypropylene, it is preferred to blend ethylene propylene rubber into the polyolefin component, and then blend this combination with the fluoropolymer. Alternatively, an ethylene propylene copolymer may be used as the polyolefin component itself. When adding rubbery materials to the polyblend system, preferred amounts generally range from about 5% to about 50%, particularly about 5% to about 50%. Most preferred being about 5% to about 15%.

Formation of laminated composites using the blend adhesives of the present invention may be achieved by means conventional to the art. These include various processing techniques such as press molding and coextrusion processes.

In a preferred embodiment, the polymers are colaminated using a coextrusion process. U.S. Pat. No. 3,836,620 to Bhuta, et al. provides a detailed description of simultaneously extruding melts of desired polymers through a common flat die, employing extruders. This patent is herein incorporated by reference insofar as it pertains to the method of the present invention.

Generally speaking, a coextrusion setup may consist of separate melt feed extruder systems commensurate with the number of different layers it is desired to bond. Melt processing of polymers requires specific temperature ranges. The requisite temperature may be selected by determining the melting point and thermal stability of the blend components, as well as their relative melt viscosities. Polymers that are melt blended together to form the matrix-matrix adhesive must be heat stable at the required melt temperature of each of the respective components. When additives are incorporated, extensive color formation and bubbling can occur at the required melt temperatures. Accordingly, when additives are used, it is preferable to carry out the processing at the lowest possible temperatures. Temperature ranges for most practical purposes are usually 200° C. to 350° C. Above about 350° C. extensive decomposition of most polymers takes place, making the materials of little use. Thus, for most purposes about 200° C. to about 350° C. is preferred. Of course, these temperatures may have to be adjusted slightly if the additives are incorporated.

The surface composition of a matrix-matrix blend morphology may not necessarily reflect the bulk composition of the polymers in an extrusion process. Orientation, or stretching the composite layers while in the melt, uniaxially or biaxially, generates a new surface whose composition will reflect the bulk composition more closely. This stretching or drawing can be done in a number of ways. For example, the ratio of the takeup velocity may be increased with respect to the exit velocity of the melt, or the blowup ratio in the case of bottle pipe or film may be raised.

The strength of the adhesive bond between the polymer layers in the composites produced according to the process of the invention may be measured by the amount of peel force required to separate the layers. The peel test yields a composite number which contains the inherent bond strength and viscoelastic work of the adhesive. This number should be as high as possible, and is generally sufficient when in a range from about 0.2-5.0 lbs/in peel force, with 1.0-5.0 lbs/in being more preferable.

The adhesive bond strength may be affected to some extent by the thickness of the adhesive layer. The requisite thickness of the adhesive layer interposed between the polymer layers of a composite prepared according to the present invention is dependent on many factors, such as the thickness of each of the polymer layers themselves, which in turn may vary according to intended use of the laminated composite. Generally speaking, a range from about 0.5 mils to about 20 mils has been useful for many practical applications, with about 0.5 mils to about 5.0 mils being preferred in some cases. A good bonding, requiring a high peel force may be achieved with an adhesive layer in this thickness range Reduction in thickness in the adhesive layer generally results in a reduction in peel strength.

The thickness of the adhesive layer may be controlled in the extrusion process by the extruder, for example by adjusting the means for pumping the adhesive layer, such as the screw rpm; or changing the rpm of the take-up roll.

EXAMPLES

Example 1

E-CTFE (sold under the trademark Halar® 5001) powder or E-CTFE powder coated with additives was combined with ethylene or propylene polymers (also in powder form), by means of a twin-screw extruder at 260° C., to melt mix the polymers. The extended strand was quenched in water and pelletized. The resulting matrix-matrix polyblend pellets were then used as a tie layer in a three layer extrusion to produce laminated sheets where the outer layers were polyethylene and E-CTFE or polypropylene and E-CTFE. Three one inch extruders were arranged to deliver molten (260° C.) polymer to a common sheeting die with a gap setting of 25 mils. The material was cast on a chill roll at 60° C. and taken up on a take-up roll.

When additives were used with these blends, they were coated from solution onto the E-CTFE powder prior to subsequent melt mixing in the twin-screw extruder. Additives used were alkylamine, alkyl urea, alkyl phenol and basic metal oxides as defined in Tables 3 and 4.

The data in Table 1 show results for blends made from Halar® E-CTFE 5001, without the additives, compounded with polypropylene of melt index 1 (series A) or with polypropylene of melt index 0.2 (series B).

For series A, best adhesion was obtained with a 50% to 55% volume fraction of Halar® E-CTFE in the blend. With series B, a level of about 35% by volume of Halar® E-CTFE appeared to be optimum.

The results for the blends of Halar® 5001 E-CTFE and a propylene-ethylene block copolymer of melt index 0.4 indicates that a level of about 40% volume of the E-CTFE component was preferred for this system (Table 2).

The beneficial effects of the addition of the adhesion promoting additives to the E-CTFE-polypropylene blends are detailed in Tables 3 and 4. In Table 3, for blends containing polypropylene of melt index 1, and additive compounds, a marked increase of the peel force required to separate the coextrusion bond was demonstrated. In the examples shown, the peel strength was increased to as high as about 2 to 6 pounds/inch (depending on specific compositions) when these additives were employed. Additional examples of the effectiveness of the additive compounds were obtained with Halar® E-CTFE blends containing 0.2 melt index polypropylene, or 0.4 melt index copolymer (Table 4). Bonding peel strengths of 2 to 5 pounds/inch were obtained when the additives were used, as compared to < 0.3 to 1.5 pounds/inch when these additives were absent from the blends.

TABLE 1

Adhesive Blends Made From Halar® 5001 E-CTFE Powder and Polypropylene Powder of Either 0.2 or 1 Melt Index - No Adhesive Promoting Additives

| E-CTFE (Volume %) | Polypropylene (Volume %) | Average Peel Force (Pound/Inch) |
|---|---|---|
| Series A, Using Polypropylene of Melt Index 1 | | |
| 40 | 60 | 0.8 |
| 45 | 55 | 0.3 |
| 50 | 50 | 1.6 |
| 55 | 45 | 1.7 |
| 60 | 40 | 0.7 |
| 65 | 35 | <0.3 |
| Series B, Using Polypropylene of Melt Index 0.2 | | |
| 30 | 70 | <0.3 |
| 35 | 65 | 1.5 |
| 40 | 60 | 1.2 |
| 45 | 55 | 1.0 |
| 50 | 50 | 1.2 |
| 60 | 40 | 0.3 |

TABLE 2

Adhesive Blends of Halar® 5001 E-CTFE Powder and Propylene-Ethylene Block Copolymer[a]

| E-CTFE (Volume %) | Propylene Copolymer (Volume %) | Average Peel Force (Pound/Inch) |
|---|---|---|
| 35 | 65 | 0.3 |
| 40 | 60 | 1.0 |
| 45 | 55 | 0.3 |
| 55 | 45 | 0.3 |

[a] Contains 9 mol percent ethylene, 0.4 Melt Index

TABLE 3

Adhesive E-CTFE-Polypropylene Blends with 1 Melt Index Polypropylene Resin

| E-CTFE (Volume %) | Polypropylene (Volume %) | Additive[a] (% Wt. based on E-CTFE) | Average Peel Strength (Pound/Inch) |
|---|---|---|---|
| 45 | 55 | none | 0.2 |
| 45 | 55 | SAM, 3 CaO, 9 | 3.0 |
| 45 | 55 | SAM, 2 CaO, 12 | 0.8 |
| 50 | 50 | none | 1.6 |
| 50 | 50 | SU, 1 CaO, 3 | 2.0 |
| 55 | 45 | none | 1.7 |
| 55 | 45 | SAM, 0.5 NP, 2 | 2.5 |
| 55 | 45 | NP, 1 CaO, 3$_2$ Ca(OH), 0.5 | 2.3 |
| 55 | 45 | SAM, 1 NP, 3 | 4.0 |
| 60 | 40 | none | 0.7 |
| 60 | 40 | NP, 4 CaO, 12 | 6.0 |
| 60 | 40 | SU, 4 CaO, 20 | 6.0 |
| 60 | 40 | NP, 1 CaO, 5 | 2.5 |

Note
[a] SAM is stearyl amine SU is stearyl urea NP is p-nonyl phenol CaO is calcium oxide Ca(OH)$_2$ is calcium hydroxide

TABLE 4

Adhesive E-CTFE-Polypropylene Blends with 0.2 Melt Index Polypropylene or with 0.4 Melt Index Propylene-Ethylene Block Copolymer

| CTFE (Volume %) | Polypropylene (Volume %) | Polypropylene (Melt Index) | Additive[a] (% Wt based on E-CTFE) | Average Peel Strength (Pounds/Inch) |
|---|---|---|---|---|
| 35 | 65 | 0.2 | none | 1.5 |
| 35 | 65 | 0.2 | SAM, 0.5 NP, 3 CaO, 10 | 2.0 |
| 45 | 65 | 0.2 | none | 1.0 |
| 45 | 65 | 0.2 | NP, 1 Ca(OH)$_2$, 0.5 CaO, 3 | 3.5 |
| 45 | 65 | 0.2 | SAM, 0.5 NP, 3 ZnO, 8 | 3.0 |

TABLE 4-continued

Adhesive E-CTFE-Polypropylene Blends with 0.2 Melt Index Polypropylene or with 0.4 Melt Index Propylene-Ethylene Block Copolymer

| CTFE (Volume %) | Polypropylene (Volume %) | (Melt Index) | Additive[a] (% Wt based on E-CTFE) | Average Peel Strength (Pounds/Inch) |
|---|---|---|---|---|
| 50 | 50 | 0.2 | Ca(OH)$_2$, 2 none | 1.2 |
| 50 | 50 | 0.2 | SAM, 0.2 NP, 1 | 2.5 |
| 50 | 50 | 0.4 | CaO, 3 none | <0.3 |
| 50 | 50 | 0.4 | SAM, 0.2 | 2.0 |
| 50 | 50 | 0.4 | NP, 3 | |
| 50 | 50 | 0.4 | SAM, 0.2 NP, 5 | 5.0 |

Example 2

COEXTRUDED E-CTFE—HIGH DENSITY POLYETHYLENE (HDPE)

Three extruders were arranged to deliver streams of molten polymer to a common pipe die having an orifice about 1.2 inches in diameter. The die and extruders were arranged so that the outer layer was composed of Paxon® type BA50-100 HDPE resin of high molecular weight characterized by a melt index of 10 (under ASTM test D1238-79 condition F) and a density of 0.950 (g/cc). Halar® E-CTFE resin having a melt index of about 2 was used to produce the inner layer of the pipe. The middle adhesive layer was produced from a blend of the following compostion:

37% by volume Halar® 5001 E-CTFE powder,
63% by volume of Paxton® FF50-100 powder,
adhesion promoting additives:
p-nonyl phenol, 1% by weight of E-CTFE
calcium oxide, 3% by weight of E-CTFE
stearyl amine, 0.2% by weight of E-CTFE The adhesive components were melt mixed by processing through a twin-screw extruder and converted into pellets prior to extrusion on the pipe equipment. Best results were obtained with the die operated at about 275° C., the adhesive extruder at 220° C. to 260° C., and the Halar® E-CTFE extruder at 220° C. to 275° C.. The HDPE extruder was used at 200° C. to 220° C.. The die was provided with concentric mandrels which allowed the three separate layers to be extruded through the die orifice. Following extrusion through the die, the molten pipe was drawn through a sizing sleeve, cooled in a water bath before cutting to length. Pipe of about one inch outside diameter was made with a total wall thickness of about 0.2 inch, about 50% of which was E-CTFE, 45% HDPE and 5% adhesive layer. The layers were strongly bonded together and did not separate when a knife cut was made through the pipe wall even though there were significant hoop stresses present as a consequence of the volume changes of each layer on cooling from the melt.

In the following examples, chlorotrifluoroethylene copolymers with ethylene (sold under the trademark Halar®) or vinylidene fluoride and vinylidene fluoride and tetrafluoroethylene (sold under the trademark Aclon®) either in powder or pellet form were melt blended with polyethylene, polyethylene ethyl methylacrylate, polyethylene acrylic acid, partially neutralized acrylic acids, polypropylene, or impact modified polypropylene, by means of a twin-screw extruder as described in Example 1. As in Example 1, when bridging agents or adhesion promotors were used with these blends, (which included stearyl amine, N,N dimethyl stearyl amine, stearyl amide, N,N dimethyl stearyl amine, stearyl urea, nonyl phenol, CaO, and MgO) these agents were usually preblended with the chlorotrifluoroethylene copolymer. The matrix-matrix polyblend adhesive was melt extruded in a three layer laminate using the technique described in Example 1, and adhesion strength evaluated primarily by measuring the peel strength of a three-layer laminate.

Example 3

A series of blends of Halar® E-CTFE and high density polyethylenes having volume fractions of the E-CTFE of .25, .30, .35, .40, .45, .50 (based on densities at 25° C.) where the apparent melt viscosities of the E-CTFE and the polyethylene at 260° C. and 100 sec$^{-1}$ were 800 and 2100 Pa.S respectively, were preblended and used as the tie layer in a three layer coextrusion Halar® E-CTFE-tie layer-polyethylene. The 180° peel strength at 5 inches per minute is shown in Table 5A. Since the apparent melt viscosity of the polyethylene is about 1.5-3 times that of the E-CTFE at processing range, to achieve the matrix-matrix morphology, a larger volume fraction of the polyethylene is required to compensate for the melt viscosity disparity. At .40 volume fraction of E-CTFE the conditions are met and satisfactory adhesion is attained.

TABLE 5A

Adhesion Strength Evaluation By Peel Force Measurements
Three Layer Construction, Halar® E-CTFE-Adhesive Tie Layer-Polyethylene
Thickness 5-6, 4-5, 18-20 mils respectively

| Adhesive Composition Volume Fraction of E-CTFE Based on Room Temperature Densities | Peel Strength 180° lbs/inch |
|---|---|
| .25 | <.1 |
| .30 | .4 |
| .35 | .5 |
| .40 | 1 |
| .45 | <.1 |
| .50 | <.1 |

The importance of the interrelationship between the optimum volume fraction and the melt viscosity in achieving the desired matrix-matrix morphology is clearly demonstrated in Table 5B in a series of blends of Halar® E-CTFE and high density polyethylene, where the melt viscosities of the E-CTFE and polyethylene at 260° C. were 800 and 600 Pa·s respectively at 100 sec$^{-1}$. Again it is clear that volume fractions of the components must be optimized to achieve optimum adhesion of laminate layers, this usually occuring when the matrix-matrix tie layer has approximately equal surface areas of the blend components.

TABLE 5B

| Adhesive Composition Volume Fraction of E-CTFE Based on Room Temperature Densities | Peel Strength 180° lbs/inch |
|---|---|
| .40 | <.1 |
| .45 | <.1 |
| .50 | .3 |
| .55 | .3 |
| .60 | .6 |
| .65 | 1.0 |
| .70 | 0.1 |

The E-CTFE-Polyethylene system, Table 6 and CTFEV$_2$-Polypropylene system, Table 7, also demonstrate the matrix-matrix adhesive concept. The adhesive strongly bonds to each surface with mechanical interlocking of the blend components. The optimum blend composition again depends on the volume fraction of the components, adjusted for the differences in melt viscosity of the blend components.

Example 4

For volume fractions .40–.65 (Series A) in Table 6, the viscosity ratio at 260° C. and 100 sec$^{-1}$ is 1 for the E-CTFE to polypropylene, and in volume fractions .30–.60 (Series B) the viscosity ratio is 0.5.

TABLE 6

| Adhesive Composition Volume Fraction of E-CTFE Based on Room Temperature Densities | Peel Strength 180° lbs/inch |
|---|---|
| Series A | |
| 40 | <.1 |
| 45 | 0.2 |
| 50 | 1.4 |
| 55 | 2.0 |
| 60 | 0.7 |
| 65 | <.2 |
| Series B | |
| 30 | <.2 |
| 35 | 1.5 |
| 40 | 1.2 |
| 45 | 1.0 |
| 50 | 1.2 |
| 55 | <.3 |
| 60 | <.1 |

Example 5

Table 7, Series A, volume fractions .40 to .65, the Aclon ® CTFE-V$_2$ to polypropylene homopolymer viscosity ratio at 270° C. at 100 sec$^{-1}$ is about 2 and in Series B the viscosity ratio of Aclon ® CTFE-V$_2$ to polypropylene copolymer with 6% polyethylene is also about 2.

TABLE 7

| Adhesive Composition Volume Fraction of CTFE-V$_2$ Based on Room Temperature Densities | Peel Strength 180° lbs/inch |
|---|---|
| Series A - polypropylene | |
| .40 | 0 |
| .45 | 0 |
| .50 | 0.4 |
| .55 | 0.4 |
| .60 | 0.1 |
| .65 | 0 |
| Series B - 6% polyethylene-polypropylene | |
| .40 | 0 |
| .45 | 0 |
| .50 | 0.6 |
| .55 | 0.5 |
| .65 | 0 |

The higher peel strength value for the copolymer shows that increasing the rubbery characteristics of the tie layer affects an increase in the adhesive strength.

Example 6

The matrix-matrix adhesive does not necessarily require the actual use of the components contained in the polymer layers it is desired to laminate, but only that each blend component in the adhesive adheres to at least one of the laminate layers. Again a matrix-matrix blend structure wherein each blend component has approximately 50% of the surface area of the adhesive is preferred. This is shown with laminates composed of polyethylene and E-CTFE with polyethylene ethyl acrylate blended with the the E-CTFE as the adhesive layer. The volume fractions of the polyethylene ethyl acrylate ranged from .25 to .55 as shown in Table 8.

TABLE 8

Adhesion Strength Evaluation By Peel Force Measurements
Three Layer Construction
E-CTFE-Adhesive Tie Layer-Polyethylene Thickness
5-6, 4-5, 18-20 Mils Respectively

| Adhesive Composition | | Peel Strength |
|---|---|---|
| E-CTFE | Polyethylene Ethylacrylate | 180° lbs/inch |
| .75 | .25 | 0 |
| .70 | .30 | 0.1 |
| .65 | .35 | 1.0 |
| .60 | .40 | .4 |
| .55 | .45 | .3 |
| .50 | .50 | .3 |
| .45 | .55 | 0 |

In the above samples, the melt viscosity ratio of the E-CTFE to polyethylene-ethylacrylate at 260° C. and a shear rate of 100 sec$^{-1}$ is about 3 and requires a larger volume fraction of E-CTFE to achieve the desired matrix-matrix morphology.

Example 7

A number of matrix-matrix blend adhesives were tried with copolymers of ethylene-acrylic or methacrylic acids and methacrylic acids partially neutralized with Na or Zn base. These blends were melt blended according to the techniques in Example 1 and molded in a press into 2-3 mil sheets. These sheets were then used as a tie layer to laminate polyethylene sheets to Halar ® E-CTFE sheets by a conventional compression molding process.

Adhesive strengths peaked at volume fractions of 0.60–0.65 for the polyethylene copolymer when its melt viscosity was higher than that of the Halar ® E-CTFE blend component and peaked at volume fractions of about 0.40 when the melt viscosity of the polyolefin was lower than the E-CTFE component. Peel strength of about 0.6 lbs. was obtained with the proper matrix-matrix formulations.

Example 8

A formulation based on the matrix-matrix blend in Example 3 where E-CTFE was at a volume fraction of .65 and polyethylene ethylacrylate was at a volume fraction of .35, was used to blow one liter bottles. These bottles were blown using three extruders feeding a parison die. Blowing and cooling were done according to conventional techniques, and the bottles were oriented on blow-up. Good bottles were produced that did not delaminate. Peel strengths of samples cut from the side of the bottles where the adhesive was about 0.5 mils thick, gave about 0.6 lbs/in peel strength, with a peel angle of 180°. Since the peel strength was significantly higher than expected at this adhesive layer thickness, the strength may be attributed to the orientation on blow-up of the bottle.

Example 9

To improve the cohesive strength of the tie layer, which is primarily a reflection of the mechanical interlocking of the matrix-matrix components, interfacial additives were employed in an E-CTFE/Polyethylene system. For example, stearyl amine, 1% by weight of the Halar ® E-CTFE was added and the resulting laminate demonstrated peel strengths of 5 lbs/in. Similarly, the additions of other additives and resulting peel strength are listed in Table 9.

In cases where less than the disclosed optimum compositions for the matrix-matrix adhesives and bridging agents were used, adhesion primarily to only one layer in a laminate was demonstrated, as the other surface layer in the laminate delaminated upon cooling. The morphology of the adhesive in these cases was determined to be of the "matrix-island" type, with the bonded layer serving as the matrix. The peel strength of such a laminate structure becomes nil, as delamination occurs spontaneously upon cooling from the melt, without the execution of a peel force. Under these conditions, the bridging agents did not show an advantage.

TABLE 9

Optimum Compositions for Matrix-Matrix Adhesives for the Polyethylene/E-CTFE System With Interfacial Bridging Agents

| Adhesive Composition | Peel Strength 180° lbs/in |
| --- | --- |
| E-CTFE 35 vol. % P.E. 65 vol. % 1 wt % stearylamine | 5.0 |
| E-CTFE 35 Vol. % P.E. 65 Vol. % 1 wt % nonylphenol | 2.0 |
| E-CTFE 35 vol % P.E. 65 vol % 3 wt % nonylphenol | 1.3 |
| E-CTFE 35 vol % P.E. 65 vol % 1 wt % stearyl amine 3 wt % CaO | 0.8 |
| E-CTFE 40 vol % P.E. 60 vol % 1 wt % stearyl amine | 4.0 |
| E-CTFE 40 vol % P.E. 60 vol % 2 wt % N,N dimethylstearylamine | 0.6 |
| E-CTFE 40 vol. % P.E. 60 vol. % 1 wt % stearyl urea 3 wt % CaO | 5 |
| E-CTFE 40 Vol. % P.E. 60 Vol. % 1 wt % nonylphenol 3 wt % CaO | 4 |
| E-CTFE 40 vol % P.E. 60 vol % 3 wt % nonylphenol 9 wt % CaO | 5 |
| E-CTFE 35 vol % P.E. 65 vol wt % 1 wt % stearyl amine 3 wt % CaO | 5 |
| E-CTFE 45 vol % P.E. 55 vol % 1 wt % nonylphenol 1 wt % CaO | 4.0 |
| E-CTFE 60 vol % P.E. ethyl acrylate 40 vol % 1 wt % stearyl amine | 5 |
| E-CTFE 60 vol. % P.E. ethyl acrylate 40 vol % 1 wt % N,N dimethyl stearylamide | 0.8 |
| E-CTFE 60 Vol. % P.E. ethylacrylate 40 vol % 1 wt % stearylamine 3 wt % CaO | 2.0 |
| E-CTFE 60 vol % P.E. ethyl acrylate 35 vol % 3 wt % stearyl urea 3 wt % CaO | 3.0 |
| E-CTFE 70 vol % P.E. ethyl acrylate 30 vol % | 5 |

TABLE 9-continued

Optimum Compositions for Matrix-Matrix Adhesives for the Polyethylene/E-CTFE System With Interfacial Bridging Agents

| Adhesive Composition | Peel Strength 180° lbs/in |
| --- | --- |
| 1 wt % stearylamine E-CTFE 70 vol % P.E. ethyl acrylate 30 vol % 1 wt % N,N dimethyl amine | 1.0 |
| E0CTFF 70 vol % P.E. ethyl acrylate 30 vol % 2 wt % N,N dimethyl stearylamine | 2 |

What is claimed is:

1. A method for forming a coextruded laminated composite of polymers, which comprises the steps of:
    coextruding each of said polymers and an adhesive comprising a matrix-matrix polyblend of said polymers,
    each of said polymers being arranged as layers in apposition to one another, with said adhesive comprising a matrix-matrix polyblend of said polymers interposed between said layers, said polymers in the adhesive being present as interfacially interlocked polymer volume fractions; and
    applying heat and pressure, so as to form a coextruded laminated composite comprising polymer layers with the matrix-matrix polyblend adhesive interposed between and bonded to the polymer layers.

2. The method of claim 1 which further comprises the step of forming the adhesive by melt blending a powder blend of the polymers comprising said adhesive.

3. The method of claim 1 wherein a laminated composite is formed with a halopolymer and a polyolefin.

4. The method of claim 3 wherein the halopolymer is ethylene-chlorotrifluoroethylene.

5. The method of claim 4 wherein the polyolefin is selected from the group consisting of polyethlyene and polypropylene.

6. The method of claim 5 further comprising the step of adding ethylene propylene rubber to the matrix-matrix polyblend adhesive.

7. The method of claim 3 wherein the fluoropolymer is a perfluoralkoxy polymer and the polyolefin is polyethylene.

8. The method of claim 3 wherein the fluoropolymer is chlorotrifluoroethylene-vinylidene fluoride and the polyolefin is polyethylene.

9. The method of claim 1 further including the step of adding an additive to the matrix-matrix polyblend that induces interfacial bridging between the polymers in the polyblend.

10. The method of claim 9 wherein the additive is selected from the group consisting of compounds having one or more moieties compatible with both of the polymers in the polyblend, compounds having one or more moieties compatible with one polymer and reactive to the other, and compounds having one or more moieties reactive to both polymers.

11. The method of claim 10 wherein the additive has at least one moiety reactive with one polymer in the polyblend and further comprises an alkyl group having about 1 to about 20 carbon atoms.

12. The method of claim 11 wherein the additive has about 9 to about 18 carbon atoms.

13. The method of claim 12 wherein the reactive moiety comprises one or more moieties reactive with a halopolymer.

14. The method of claim 13 wherein the reactive moiety is selected from the group consisting of amino functionalities, thiols, phenols, amides, and ureas.

15. The method of claim 14 wherein the additive further comprises a metal oxide.

16. The method of claim 1 wherein each of said polymers occupies at least about 30% of the surface area of said adhesive.

17. The method of claim 16 wherein each of said polymers occupies from about 30% to about 70% of the surface area of said adhesive.

18. A coextruded laminated composite formed according to the process of claim 1.

19. A coextruded laminated composite formed according to the process of claim 3.

20. A method of forming a coextruded laminated composite of a first polymer and a second polymer comprising:
coextruding each of said polymers and an adhesive comprising a matrix-matrix polyblend of first component which adheres to said first polymer and a second component which adheres to said second polymer,
each of said polymers being arranged as layers in apposition to one another, with said adhesive comprising a matrix-matrix polyblend of a first component which adheres to said first polymer and a second component which adheres to said second polymer and being interposed between said layers, said components in said adhesive being present as interfacially interlocked fractions of said first component and said second component; and
applying heat and pressure, so as to form a coextruded laminated composite comprising the polymer layers with the matrix-matrix polyblend adhesive interposed between and bonded to the polymer layers.

21. A coextruded laminated composite formed according to the process of claim 20.

22. A coextruded laminated container for holding or transporting highly reactive chemicals comprising layers of incompatible polymers with an adhesive comprised of a matrix-matrix polyblend of said incompatible polymers interposed between said layers, said polymers in the adhesive being present as interfacially interlocked polymer volume fractions.

23. The container of claim 22 wherein each of said incompatible polymers occupies at least about 30% of the surface area of said adhesive.

24. The container of claim 23 wherein each of said incompatible polymers occupies from about 30% to about 70% of the surface area of said adhesive.

25. An extruded adhesive for bonding incompatible polymer layers comprising a matrix-matrix polyblend of the incompatible.

26. The adhesive of claim 25 wherein each of said incompatible polymers occupies at least about 30% of the surface area of said adhesive.

27. The adhesive of claim 26 wherein each of said incompatible polymers occupies from about 30% to about 70% of the surface area of said adhesive.

28. An extruded adhesive for bonding a fluoropolymer to a polyolefin comprising a matrix-matrix polyblend of the polyolefin and fluoropolymer.

29. The adhesive of claim 28 wherein each of said fluoropolymer and said polyolefin occupies at least about 30% of the surface area of said adhesive.

30. The adhesive of claim 29 wherein each of said fluoropolymer and said polyolefin occupies from about 30% to about 70% of the surface area of said adhesive.

* * * * *